Figure 1:
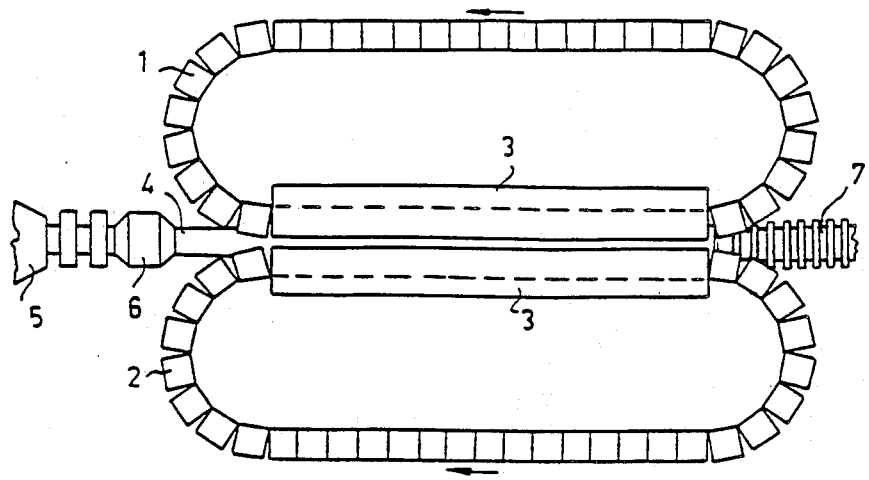

United States Patent [19]

Järvenkylä et al.

[11] Patent Number: 4,867,928
[45] Date of Patent: Sep. 19, 1989

[54] APPARATUS AND A METHOD FOR THE PRODUCTION OF RIBBED PIPES

[75] Inventors: Jyri Järvenkylä, Salpakangas, Finland; Ingemar Carlsson, Fristad, Sweden

[73] Assignee: Uponor N.V., Philipsburg, Netherlands

[21] Appl. No.: 188,193

[22] Filed: Apr. 28, 1988

Related U.S. Application Data

[63] Continuation-in-part of Ser. No. 883,486, Jul. 8, 1986, abandoned.

[30] Foreign Application Priority Data

Jan. 13, 1986 [FI] Finland .................................. 860135

[51] Int. Cl.$^4$ ............................................. B29C 47/86
[52] U.S. Cl. ..................................... 264/508; 264/167; 264/209.3; 425/326.1; 425/327; 425/393; 425/396
[58] Field of Search ................. 264/167, 564, 508, 512, 264/515, 209.1, 209.3-209.8, 173; 425/380, 325, 326.1, 393, 396, 532, 539, 376.1, 516, 504, 327

[56] References Cited

U.S. PATENT DOCUMENTS

| | | | |
|---|---|---|---|
| 3,280,430 | 10/1966 | Antobus | 425/539 |
| 3,872,893 | 3/1975 | Roberts | 264/209.1 |
| 3,994,646 | 11/1976 | Hauck | 425/396 |
| 3,998,579 | 12/1976 | Nordstrom | 425/396 |
| 4,226,580 | 10/1980 | Lupke et al. | 264/508 |
| 4,365,948 | 12/1982 | Chaplain | 264/508 |
| 4,510,013 | 4/1985 | Lupke et al. | 425/396 |
| 4,534,923 | 8/1985 | Lupke | 264/167 |
| 4,591,323 | 5/1986 | Boen | 425/326.1 |
| 4,710,337 | 12/1987 | Nordstrom | 264/568 |

FOREIGN PATENT DOCUMENTS

| | | | |
|---|---|---|---|
| 1172813 | 8/1984 | Canada . | |
| 2362444 | 6/1975 | Fed. Rep. of Germany . | |
| 2709395 | 9/1978 | Fed. Rep. of Germany . | |
| 47-34824 | 9/1972 | Japan | 425/380 |
| 77052009 | 5/1978 | Sweden . | |
| 1032691 | 6/1966 | United Kingdom . | |
| 1132235 | 10/1968 | United Kingdom | 264/173 |

*Primary Examiner*—Jeffery Thurlow
*Attorney, Agent, or Firm*—Ladas & Parry

[57] ABSTRACT

This invention relates to an apparatus and a method for the production of outwardly ribbed, plastic pipes. The apparatus includes a core around which a plasticized material is pressed from a nozzle. A kernel having an essentially constant diameter is positioned at the terminal end of the core for a smooth inner face of the pipe. The outer face of the pipe is ribbed by grooves of axially displaceable chill moulds. The end zone of the kernel is provided for the cooling of the inner face of the pipe. In known apparatuses the grooves of the chill moulds are often filled incompletely and the inner face of the pipe becomes uneven on account of air bubbles, for instance. These disadvantages are avoided by heating an initial zone of the kernel for heating the inner face of the pipe and by shaping the surface of the initial zone to slightly expand conicallly in the production direction.

15 Claims, 2 Drawing Sheets

APPARATUS AND A METHOD FOR THE PRODUCTION OF RIBBED PIPES

This is a continuation-in-part of co-pending application Ser. No. 883,486 filed on July 8, 1986 now abandoned.

This invention relates to a method and apparatus for the production of an outwardly ribbed, plastic pipe having a smooth inner face.

A known apparatus has a core which is formed by a spindle, a conically enlarging mandrel having one end on the spindle and an opposite end, i.e. positioned after said spindle and conically enlarging away from the spindle in the production direction of the apparatus, and a kernel which has a substantially constant diameter and which is positioned after said mandel, i.e. at its opposite end, initially with the diameter thereof. An extrusion sleeve surrounds said spindle so as to form a nozzle for the pipe material; and chill moulds, which surround said extrusion sleeve and said core, along runs of at least two endless paths,; are transportable along the runs of the endless paths in the production direction. The inner surface of each chill mould is provided with grooves for the formation of the outward ribs on a pipe. An end zone of the kernel, spaced from the nozzle, is cooled.

Various other apparatuses and methods have been suggested for the production of solid-wall ribbed pipes; none of these, however, is in industrial use on account of some major disadvantages thereof. U.K. Patent Specification No. 1 431 796 discloses an extrusion moulding method which is characterized by creating a rather low moulding pressure, mainly by means of an extruder. DE Patent Specifications Nos. 2 362 444 and 1 233 128 and FR Patent Specification No. 7 315 485 disclose injection moulding methods which are characterized by a small closed moulding space wherein there prevails a high pressure. FI Patent Specification No. 60 825 and DE Patent Specification No. 2 709 395 disclose press moulding methods which are characterized by an open moulding space and by creating a pressure by means of the extruder on one hand and by means of the traction force of a conically enlarging part of the core, i.e. the mandrel, and the chill moulds on the other hand. A similar straight-kernel structure is also known from the manufacturing technique of double-walled corrugated pipes, see e.g. CA Patent Specification No. 1 172 813.

The apparatus disclosed at the beginning of this specification is known from EP Patent Specification No. 0 005 104 (U.S. Pat. No. 4,365,948), wherein FIG. 6 illustrates an apparatus operated by the extrusion moulding method and by means of which solid-wall plastic pipes having a smooth inner face and a corrugated outer face can be manufactured. This figure shows a kernel the cooling means of which are positioned only at the terminal end of the kernel, while the initial portion of the kernel is uncooled. The kernel has a constant diameter.

A major disadvantage of the manufacturing methods mentioned above is that it is very difficult to produce by means thereof a pipe having the high, narrow ribs which would be the most advantageous for use of the pipe. In order to fill up the deep narrow grooves on the inner surface of the chill moulds for this, extremely high pressures have to be applied, which requires high durability from the apparatus. These problems are further aggravated when a stiff type of plastic, such as a PVC without any softener, is used.

Another major problem is the surface finish of the inner face of the pipe. The smoothness of the inner face is impaired by, e.g., the following factors: air bubbles formed in the moulding space; cracks in the melt from the high shearing speed; irregularities and cold seams from the layer structure of the material; adherence of the inner face to the kernel; and uneven cooling of the pipe material, which gives rise to recesses and air bubbles within the material. For these reasons, it has not previously been possible to manufacture high-quality ribbed pipes industrially by the methods mentioned above.

The object of the present invention is to provide an apparatus and a method for the production of ribbed pipes, by means of which the pipes can be provided with complete ribs and a smooth inner face.

The apparatus as initially described and, further, according to the invention is characterized in that an initial zone of the kernel between said mandrel and said end zone of the kernel is heated at least in a second of first and second portions thereof axially therealong in that, production direction, and in that the diameter of at least the second portion of the initial zone of the kernel increases slightly in the production direction.

Thus, in one apparatus according to the invention, the initial zone of the kernel is heated and its diameter increases slightly towards the end zone. As a result, the pipe material is still heated at the initial zone of the kernel and simultaneously forced towards the chill moulds, and the material unexpectedly fills all the grooves of the moulds reliably while the inner face of the pipe becomes completely smooth. The advantageous influence of the structure according to the invention might be due to the fact that after the grooves of the chill moulds have been filled by the action of the extrusion pressure at the conical mandrel, the moulds begin to chill the material, which then begins to contract. Any imperfections caused by different cooling rates and contraction of the material are then prevented by creating a notable terminal pressure in the grooves of the chill moulds with the slight conical enlargement of the kernel and its heating, as a result of which the material to be moulded conforms accurately to the surfaces of the chill moulds and the kernel. This terminal pressure is independent of the extrusion pressure, and it is therefore easily adjustable by changing the heating effect. The length of the initial zone of the kernel also affects the terminal pressure.

The heating can be of one portion of the initial zone only, but it is of advantage in view of the operation that the heating of the initial zone extend over the whole length of the zone. For the same reason, it is desirable that the diameter of the initial zone increases essentially evenly.

The kernel in the present description means that part of the core by which the inner face of the pipe is finished. Therefore it is evident that the diameter cannot vary to any great degree. Consequently, the kernel of known apparatuses has a constant diameter or the diameter decreases to some extent towards the terminal end so that a cooling, contracting pipe would not adhere thereto. For this reason, the diameter of the initial zone of the kernel, at and equal to the mandrel according to the present invention, increases only slightly in the production direction, i.e. enlarges substantially less than the mandrel, so that the diameter of the kernel at the end of the initial zone and, thereby, the inner face of the pipe, is from 0.2 to 2.0 percent and, preferably, about 1.0 percent, larger than at the beginning of the initial zone.

In order that the initial zone of the kernel would have the desired effect on the moulding of the pipe, it must be sufficiently long. According to the invention the length of the initial zone in the axial direction of the apparatus is from 10 to 100 percent and, preferably, about 50 percent, of the outer diameter of the pipe, i.e. of the diameter between the inner surfaces of chill moulds surrounding the extrusion sleeve and core.

An unusually high friction exists between the material and the kernel due to the terminal pressure. Any disadvantageous effects resulting therefrom can be eliminated by providing the kernel with a suitable plastic repellent coating, e.g. by a boric treatment, by the use of a lubricant, or by providing part of the kernel with a groove or grooves, which may be spiral around the kernel, to prevent the material from sticking fast to the surface of the kernel.

The invention is also concerned with a method for the production of outwardly ribbed, plastic pipe having a smooth inner face, wherein a material which is in a plasticized state is extruded into a ring-shaped moulding space defined between the end face of an extrusion sleeve, a core comprising a spindle, a conically enlarging mandrel and a kernel as described above projecting from the extrusion sleeve, and chill moulds which surround said extrusion sleeve and core and move in the production direction of the apparatus. The inner surface of each chill mould is provided with grooves for the formation of the ribs, the material which is thus moulded into a pipe being cooled by the chill moulds and, if cooled, an end zone of the kernel.

The method according to the invention is characterized in that the inner face of the material which has been pipe shaped is heated and increased slightly in diameter by the initial zone.

Figure 2:
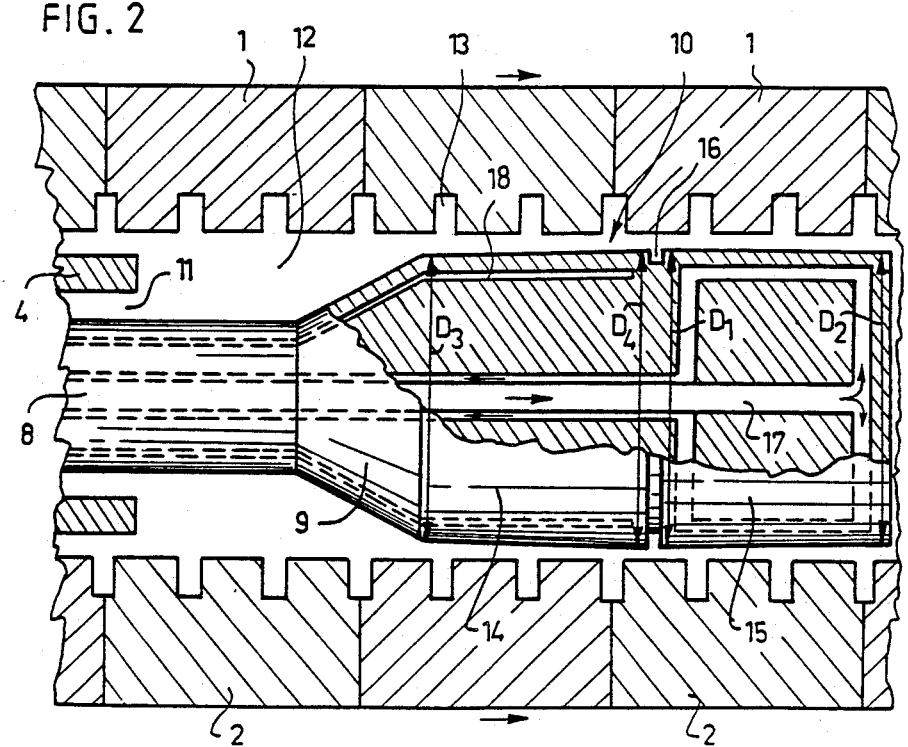
Figure 3:
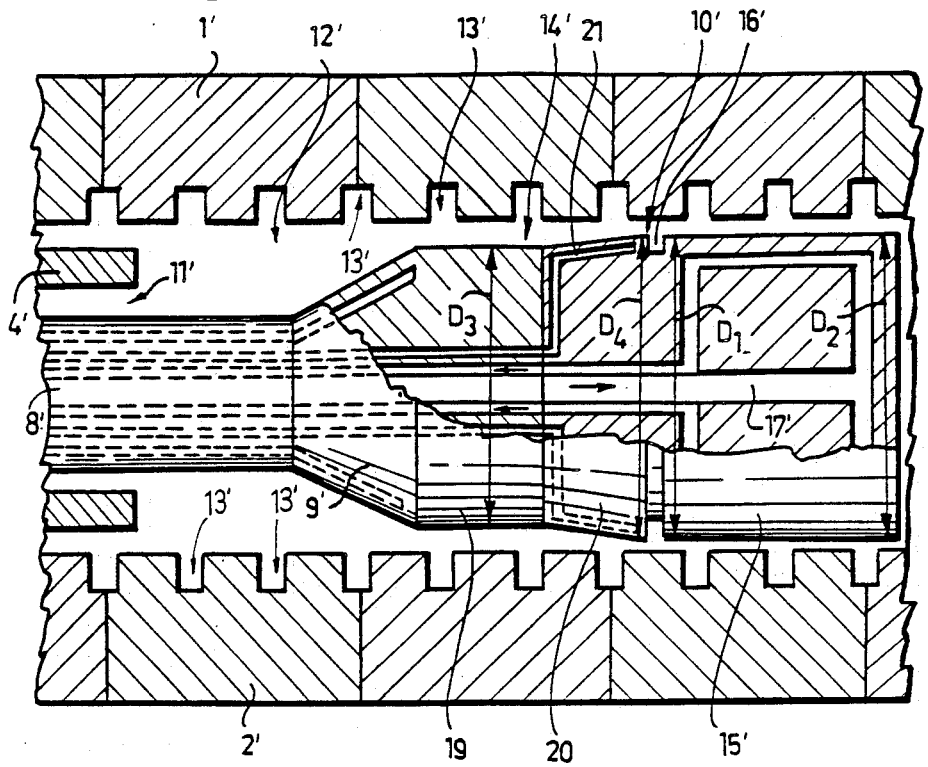

Preferred embodiments of the invention will be described more closely below with reference to the attached drawing, wherein FIG. 1 is a general view of an apparatus for the production of ribbed pipes, FIG. 2 is an enlarged longitudinal section of one detail of the apparatus; and FIG. 3 is an enlarged longitudinal section of a detail corresponding to that of FIG. 2, but of another apparatus.

The apparatus shown in FIG. 1 comprises two chill moulds 1 and 2 which move along endless paths and which meet each other within the area of guide rails 3 to form a cylindrical mould. An extrusion sleeve 4 connected to an extrusion head 6 of an extruder 5 extends into said mould. It is also shown in FIG. 1 how a finished pipe 7 protrudes from the other end of the mould formed by the chill moulds.

FIG. 2 is a more detailed view of those parts of the apparatus which take part in the moulding of the pipe. A spindle 8 is positioned on the central line of the apparatus partially within the extrusion sleeve 4, which spindle 8 is straight, i.e. it has a constant diameter. A conically enlarging mandrel 9 is positioned after the spindle so that it is wholly outside the extrusion sleeve, and a kernel 10 having an essentially constant diameter is positioned after the mandrel. The spindle 8, the mandrel 9 and the kernel 10 together form the core of the apparatus.

The extrusion sleeve 4 and the spindle 8 define therebetween a ring nozzle 11 wherefrom the material to be moulded, e.g. a plastic substance, is fed into a moulding space 12 defined between the extrusion sleeve 4, the chill moulds 1, 2, the spindle 8 and the mandrel 9. In order to obtain a pipe having a ribbed outer face the inner surface of the chill moulds is provided with mutually spaced ring-shaped grooves 13 into which the plastic material is forced for the formation of the ribs.

The kernel 10 is formed by two successive parts: an initial zone 14 and an end zone 15. These zones are separated from each other by means of a peripheral groove 16 out of which a lubricant, e.g. air, can be fed auto the surface of the end zone 15 of the kernel. Cooling means 17 (shown schematically in the drawing) are provided within the end zone 15 for e.g. a liquid coolant. The cooling means enable the surface of the end zone 15 and, consequently, the inner face of the pipe moulded of the material to be cooled so that the pipe 7 keeps its shape when removed from the manufacturing apparatus.

The diameter of the end zone 15 is slightly reduced from the groove 16 onwards so that the diameter $D_1$ is about 1 percent larger than the diameter $D_2$. So this tapering is very gentle, although it has been exaggerated in the drawing for the sake of clarity.

According to the invention the initial zone 14 of the kernel, which zone is positioned between the mandrel 9 and the groove 16, enlarges slightly towards the groove 16 and is provided with heating means.

The diameter of the initial zone 14 increases evenly from the diameter $D_3$, which is the diameter of the initial zone adjacent the mandrel 9, to the diameter $D_4$, which is the diameter of the initial zone at the groove 16, so that the diameter $D_4$ is about 1 to 2 percent larger than the diameter $D_3$. Although this enlargement is very small it has proved to be of great importance in practice. The initial zone is further provided with heating means extending over the whole length of the zone, which means are shown schematically in the drawing and indicated therein by the reference numeral 18.

The length of the initial zone is 10 to 100 percent, preferably about 50 percent, of the outer diameter of the pipe, and the length of the end zone 15 is 50 to 200 percent of the outer diameter of the pipe.

The chill moulds 1, 2 are provided with cooling means (not shown) for the cooling of the outer face of the pipe.

The apparatus shown in the drawing operates in the following way. A pressurized material to be moulded, such as a plastic substance, is fed from the nozzle 11 between the extrusion sleeve 4 and the spindle 8 into the moulding space 12, in which it is forced outwards by the action of the conically enlarging mandrel 9 so that it fills the grooves 13 of the chill moulds and the space defined between the chill moulds and the core of the apparatus. The material which has been forced into the grooves 13 forms the ribs of the pipe, and the material which remains between the chill moulds and the core forms the wall of the pipe.

When the material makes contact with the chill moulds 1, 2, it begins to cool, while those portions of the material which are positioned closest to the kernel are maintained in a plasticized state since the initial zone 14 of the kernel is heated by said means 18. By virtue of the heating of the material and the enlarging diameter of the initial zone 14, the material fills properly all the grooves 13 and becomes very homogeneous in the area of the initial zone, on account of which the inner face of the pipe, too, becomes very smooth.

After the pipe has passed by the groove 16, it is began to be cooled also on the inside by means of the cooling means 17, whereby the material is stiffened to such an extent that it keeps its shape when it is removed from the apparatus. The pipe is contracted during the cooling step, and the end zone of the kernel tapers slightly towards the end thereof in order to prevent the pipe from adhering to the kernel. For the same reason, a lubricant is fed out of the groove 16 on the surface of the end zone.

As distinct from the above-described, the heating means 18 may extend merely over a part of the length of the initial zone and the groove 16 can, of course, be left out if there is no need to feed a lubricant on the surface of the kernel. It is further to be noted that the inclination of the surface of the initial zone 14 has been exaggerated to some extent in the drawing for the sake of clarity.

The preferred embodiment of the other apparatus shown in FIG. 3 is substantially the same in structure and operation as that already described with reference to FIGS. 1 and 2 and, therefore, correspondingly referenced, with primes, without further description. It differs only in that the initial zone at 14' of the kernel at 10' has first and second, axially successive, coaxial portions 19, 20, respectively, in the production direction.

The first portion 19 of the initial zone of the kernel has one end of the opposite end of the mandrel 9' from the end of the mandrel 9' on the spindle 8'. It is cylindrical, with a constant diameter $D_3$ corresponding to that of the opposite end of the mandrel. Its cylindrical surface is not appreciably heated, because coaxial heating passages 17' and 21 extend coaxially therethrough too far from its cylindrical surface for appreciably heating it.

The second portion 20 of the initial zone of the kernel has one end on the opposite end of the first portion 19 with the diameter thereof. It conically enlarges therefrom to an opposite end at the groove 16' to the end zone 15' of the kernel by from about 1% to about 2% in diameter, so that the diameter $D_4$ of its opposite end is that much longer than that of its one end and the corresponding diameter $D_3$ of the first portion 19 of the initial zone of the kernel. Its conical surface is heated from portions of the heating passage 21 sufficiently close thereto to be effective for this.

In the method, the purpose of the first and second portions of the initial zone of the kernel is, basically, the same as that previously described with reference to FIGS. 1 and 2, i.e., to fill the grooves 13' of the chill moulds 1', 2' more completely with plastic pipe material and to make the inner face thereof smoother than would occur without the initial zone of the kernel. As before, this is probably achieved by the slight conical enlargement and heating of the second portion 20 of the initial zone of the kernel. This again presses heat-softened plastic pipe material firmly between the second portion of the initial zone of the kernel and the chill moulds after the plastic material has cooled somewhat in the chill moulds from the similar pressing of the mandrel and, thus, shrunk somewhat from the grooves with thermal variations about the kernel depending on inherent variations the plastic material, thereby thermally affecting both the ribs moulded by the grooves and the inside surface of the pipe about the kernel. It is thus apparent that the function of the unheated, cylindrical first portion 19 of the initial zone of the kernel is to provide time for these thermal effects to occur as the plastic material is progressed with the chill moulds therealong from the mandrel to the second portion 20 of the initial zone of the kernel.

It will be understood that other variations, combinations and permutations of the invention as would occur to one of ordinary skill in the art are contemplated as within the scope of the invention as described above and defined by the following claims thereto.

What we claim is:

1. Apparatus for producing an outwardly-ribbed, plastic pipe having a smooth inner face, the apparatus comprising:
   a core comprising a spindle, a mandrel having one end on one end of the spindle and conically enlarging away from the spindle, in a production direction, to an opposite end, and a kernel of substantially constant diameter at the opposite end of the mandrel with the diameter thereof, the kernel having an initial zone closest to the mandrel at least a second portion of which enlarges in diameter in the production direction only slightly, substantially less than the mandrel, and an end zone farthest from the mandrel;
   heating means for heating at least the second portion of the initial zone of the kernel;
   an extrusion sleeve surrounding substantially only the spindle of the core for forming a nozzle about the spindle, whereby to extrude plastic material in the production direction about the spindle for forming a pipe; and
   chill moulds surrounding the extrusion sleeve and core along runs of at least two endless paths and transportable along the runs of the endless paths in the production direction, the inner surface of each chill mould having grooves for forming outward ribs on the pipe in cooperation with the mandrel and initial zone of the kernel.

2. An apparatus according to claim 1, wherein the heating means of the initial zone extend over the whole length of the initial zone.

3. An apparatus according to claim 1, wherein the diameter of the initial zone increases substantially evenly.

4. An apparatus according to claim 1, wherein the diameter of the initial zone increases from 0.2 to 2.0 percent.

5. An apparatus according to claim 1, wherein the length of the initial zone in the production direction is from 10 to 100 percent of the diameter of the inner surfaces of the chill moulds surrounding the extrusion sleeve and core.

6. An apparatus according to claim 1, and further comprising stick prevention means on an outer surface of the kernel selected from the group consisting of a boric treatment, a lubricant, and a groove or grooves extending around the kernel for preventing the plastic pipe material form sticking thereto.

7. An apparatus according to claim 3, wherein the diameter of the initial zone increases from 0.2 to 2.0 percent.

8. An apparatus according to claim 4, wherein the diameter of the initial zone increases about 1.0 percent.

9. An apparatus according to claim 7, wherein the diameter of the initial zone increases about 1.0 percent.

10. An apparatus according claim 5, wherein the length of the initial zone in the production direction is about 50 percent of the diameter of the inner surfaces of the chill moulds surrounding the extrusion sleeve and core.

11. A method of producing an outwardly-ribbed, plastic pipe having a smooth inner face, the method comprising:

provide a core comprising a spindle, a mandrel having one end of one end of the spindle and conically enlarging away from the spindle, in a production direction, to an opposite end, and a kernel of substantially constant diameter at the opposite end of the mandrel with the diameter thereof, the kernel having an initial zone closest to the mandrel at least a second portion of which enlarges in diameter in the production direction only slightly, substantially less than the mandrel, and an end zone farthest from the mandrel;

heating at least the second portion of the initial zone of the kernel;

surrounding substantially only the spindle of the core with an extrusion sleeve for forming a nozzle about the spindle;

substantially the extrusion sleeve and core with chill moulds along runs of at least two endless paths, inner surfaces of the chill moulds having grooves therein;

transporting the chill moulds along the runs of the endless paths in the production direction;

extruding plastic material from the nozzle in the production direction about the core and into the chill moulds for forming an outwardly-ribbed, plastic pipe;

pressing the plastic material into the chill moulds and grooves thereof with the conical enlargement of the mandrel as the chill moulds transport the same therealong;

allowing the plastic material to start to cool in the chill moulds; and heating and again pressing the plastic material into the chill moulds and grooves thereof with the heating and slight enlargement of at least the second portion of the kernel.

12. A method according to claim 11, wherein the diameter of the inner face is increased from 0.2 to 2.0 percent.

13. A method according to claim 12, wherein the diameter of the inner face is increased about 1.0 percent.

14. An apparatus according to claim 1, and further comprising a first, cylindrical, unheated portion of the kernel between the mandrel and the second portion of the kernel.

15. A method according to claim 11, wherein allowing the plastic material to start to cool in the chill moulds comprises transporting the plastic material with the chill moulds along a first, cylindrical, unheated portion of the kernel between the mandrel and the second portion of the kernel.

* * * * *